(12) United States Patent
Capaldi-Tallon

(10) Patent No.: US 6,273,388 B1
(45) Date of Patent: Aug. 14, 2001

(54) MOUNTING BASE FOR A REMOVABLE HEAD

(75) Inventor: Alan Capaldi-Tallon, Hayling Island (GB)

(73) Assignee: Apollo Fire Detectors Limited, Havant (GB)

( * ) Notice: Subject to any disclaimer, the term of this patent is extended or adjusted under 35 U.S.C. 154(b) by 0 days.

(21) Appl. No.: 09/369,637

(22) Filed: Aug. 6, 1999

(30) Foreign Application Priority Data

Sep. 25, 1998 (GB) .................................................. 9820989

(51) Int. Cl.[7] ...................................................... B42F 13/00
(52) U.S. Cl. .............................. 248/343; 174/48; 248/551
(58) Field of Search ..................................... 248/551, 906, 248/343; 174/48; 340/521

(56) References Cited

U.S. PATENT DOCUMENTS

| | | | |
|---|---|---|---|
| 3,676,570 | * 7/1972 | Gabb | ........................................ 174/61 |
| 4,783,577 | 11/1988 | Mohr . | |
| 4,883,924 | 11/1989 | Hadfield . | |
| 4,887,073 | * 12/1989 | Nakao et al. | ......................... 340/693 |
| 5,612,678 | * 3/1997 | Shibata | ................................. 340/628 |

* cited by examiner

Primary Examiner—Ramon O. Ramirez
(74) Attorney, Agent, or Firm—R. Lewis Gable; Cowan, Liebowitz & Latman, PC

(57) ABSTRACT

A mounting base 3, for example, a bezel assembly, which can be fixed, by means of screws 4, directly to a wall or ceiling, or to a conduit box 2, has cover members 5 movable between open position and closed positions. The open positions provide access to the screws so that the mounting base can be fitted or removed. The cover members are retained by the mounting base so that they can be moved between the open and closed positions without becoming detached. Each cover member is preferably hinged to the mounting base so that it can be pivoted away from the screw into the open position without becoming detached. The hinge preferably comprises a shell 8 and a pin 9, the shell being open to enable it to be fitted to the pin. A resilient tab 6 can be provided to snap fit the cover member to the base and secure it in the closed position, prior to fitting a removable head 1 to the base. The invention may be used in the field of fire detection to conceal screws to prevent vandalism or theft of a fire detector.

15 Claims, 5 Drawing Sheets

MOUNTING BASE FOR A REMOVABLE HEAD

FIELD OF INVENTION

This invention relates to a mounting base for a removable head. The mounting base may be in the form of, for example, a bezel assembly which can be fixed, by means of screws, directly to a structure, such as a wall or ceiling, or to a conduit box which is attached to such a structure. The invention may be used in the field of fire detection where, for example, the mounting base is attached to a conduit box on the ceiling of a room (whereby a conduit carrying cables can be connected to the conduit box), and a fire detecting head can then be fitted to the mounting base. Such an assembly is used for detecting a fire in the room in which it is installed.

DESCRIPTION OF PRIOR ART

Many conventional fire detectors are of a kind where a detecting head is removably secured to a base on the ceiling of a room. However, where the base is attached either directly to the ceiling, or to a conduit box by screws, the screws are visible and can be removed either to tamper with, or steal the fire detector.

OBJECT OF INVENTION

The object of the present invention is to provide a solution to the above-mentioned problem of the prior art.

SUMMARY OF INVENTION

The present invention provides a mounting base of a kind which is intended to be secured to a structure, or to a conduit box by means of screws. The mounting base is adapted for receiving a removable head, and it has at least one cover member which is movable between an open position and a closed position, the open position providing access to the respective screw so that the mounting base can be fitted or removed. The cover member is also retained by the mounting base, so that it can be moved between said open and closed positions without becoming detached from the mounting base.

Preferably, a plurality of cover members are provided and these may be equidistantly (e.g. circumferentially) spaced around the mounting base (which can be circular).

Reference to a cover member therefore includes a reference to a number of cover members (as may be required).

The cover member may partially conceal the head of the screw in its closed position, the remainder of the screw head being concealed by a part of the removable head when fitted to the base. Alternatively, the screw head may be totally concealed by the cover member in its closed position.

Preferably, the cover member has a resilient member, such as a tab which engages with an abutment on the mounting base, so as to secure, or to assist in securing, the cover member in its closed position. This ensures that the cover member(s) remains in its closed position when the head is fitted to the base. The tab is resilient enough to disengage from the abutment when the cover member is pulled away from the screw to move it into its open position.

Preferably, the cover member is hinged to the mounting base so that it can be pivoted away from the screw, into the open position, without becoming detached from the mounting base. This may be achieved, for example, by a hinge construction which comprises a shell and a pin, the shell being open to enable it to be fitted to the pin. Where the shell is cylindrical, it has an open slot running along its length which is preferably not as wide as the diameter of the pin so that the shell can be snap-fitted on to the pin. This enables the cover member to be quickly attached to the mounting base either during manufacture, or maintenance. Alternatively, the cover member is slidably mounted in the base so that it can be moved between the open and closed positions without falling out.

Preferably, the cover member is a strip which is hinged adjacent one end to the mounting base, the other end of the strip at least partially concealing the screw when the cover member is in its closed position. In one arrangement, the head traps the cover member when fitted to the mounting base, so that the cover member is further secured against removal when the head is fitted to the base. The head can be secured to the mounting base by a locking member which is preferably concealed.

Preferably, the cover member is flush with an external surface of the mounting base, e.g. a bezel assembly, when the cover member is in its closed position. This provides a neat unobtrusive finish, whereby the cover member will not be easily seen by a vandal or thief.

DESCRIPTION OF DRAWINGS

Embodiments of the invention will now be described, by way of example, with reference to the accompanying drawings, in which.

DESCRIPTION OF PREFERRED EMBODIMENTS

Figure 1A:
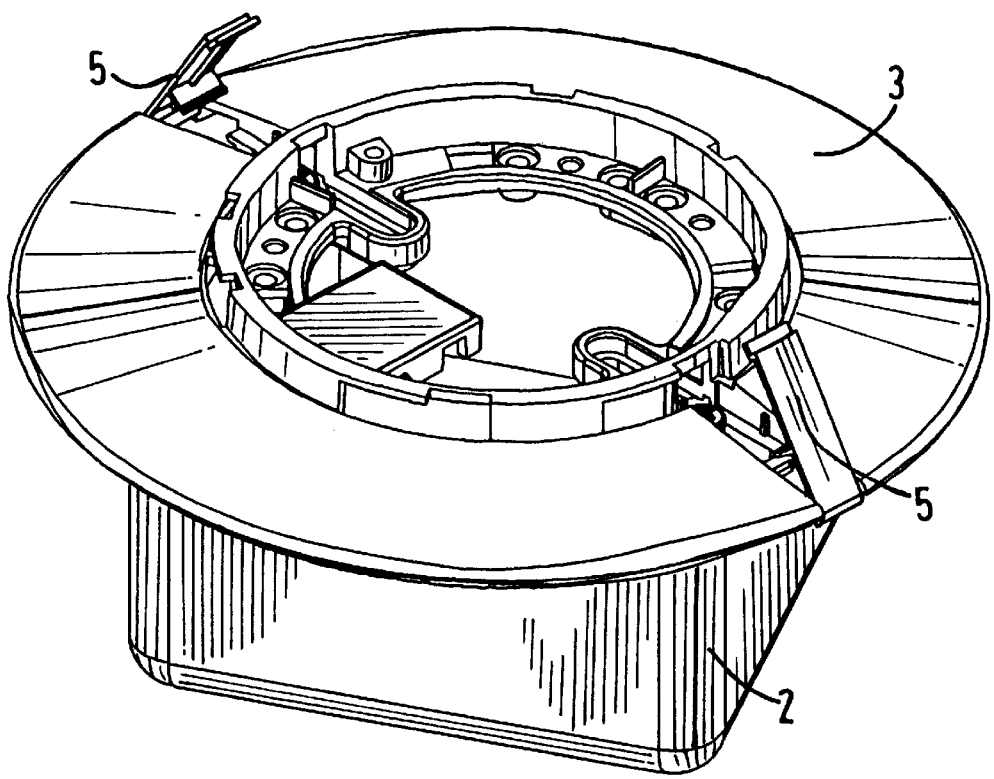
FIGS. 1a and 1b are perspective and sectional views of a mounting base according to the invention, with a head removed, embers in an open position.
Figure 1B:
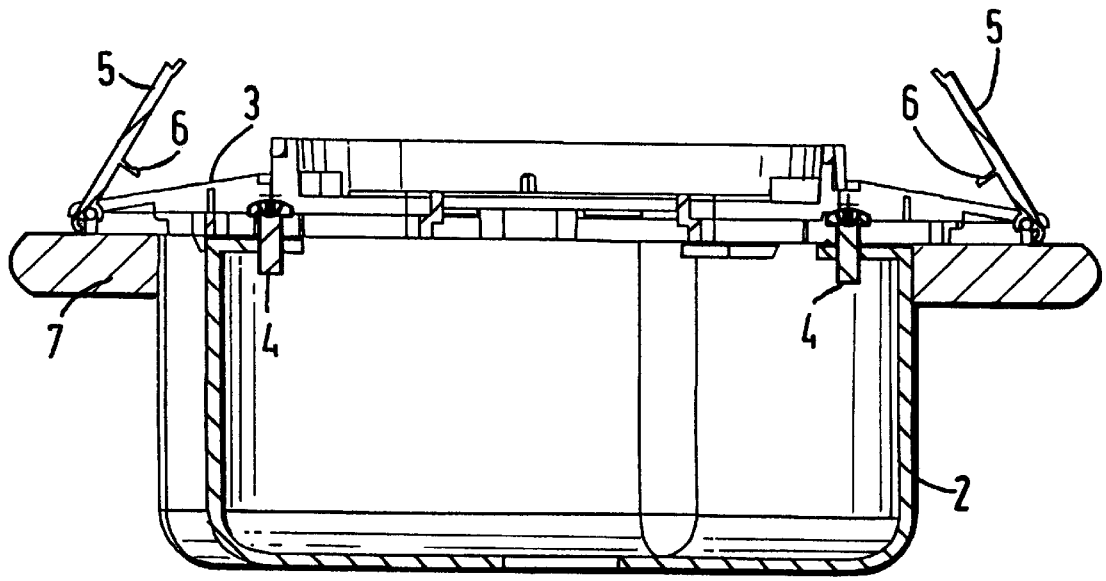

Referring to the drawings, a mounting base for a removable head 1 is in the form of a moulded bezel assembly 3 which can be secured to a conduit box 2 by screws 4. The screws pass through respective apertures in the moulding, the head of the screw being larger than the aperture when the mounting base is in its normal position on the ceiling of a room. This normal position is shown in FIGS. 1 and 2. FIG. 3 shows the mounting base 3 offset from its normal position, i.e. where the centre of the circular bezel assembly is offset from the centre of the conduit box 2. The moulding 3 includes slots 3a which are narrower than the diameter of the screw head, but slightly wider than the diameter of the screw shank. This enables the moulding to be shifted laterally, when the slots 3a and screws 4 are in alignment, into the position shown in FIGS. 1 and 2. In the position shown in FIG. 3, the moulding has wider apertures than the screw head and this enables the screw heads to pass through the wider apertures in the moulding when the mounting base is first offered up to the ceiling. At this stage, the screws 4 are loosened so that the moulding can be slid sideways, whereby the screws travel along the slots 3a over adjacent shoulders, until the mounting base is centrally aligned with the conduit box 2.

Figure 3A:
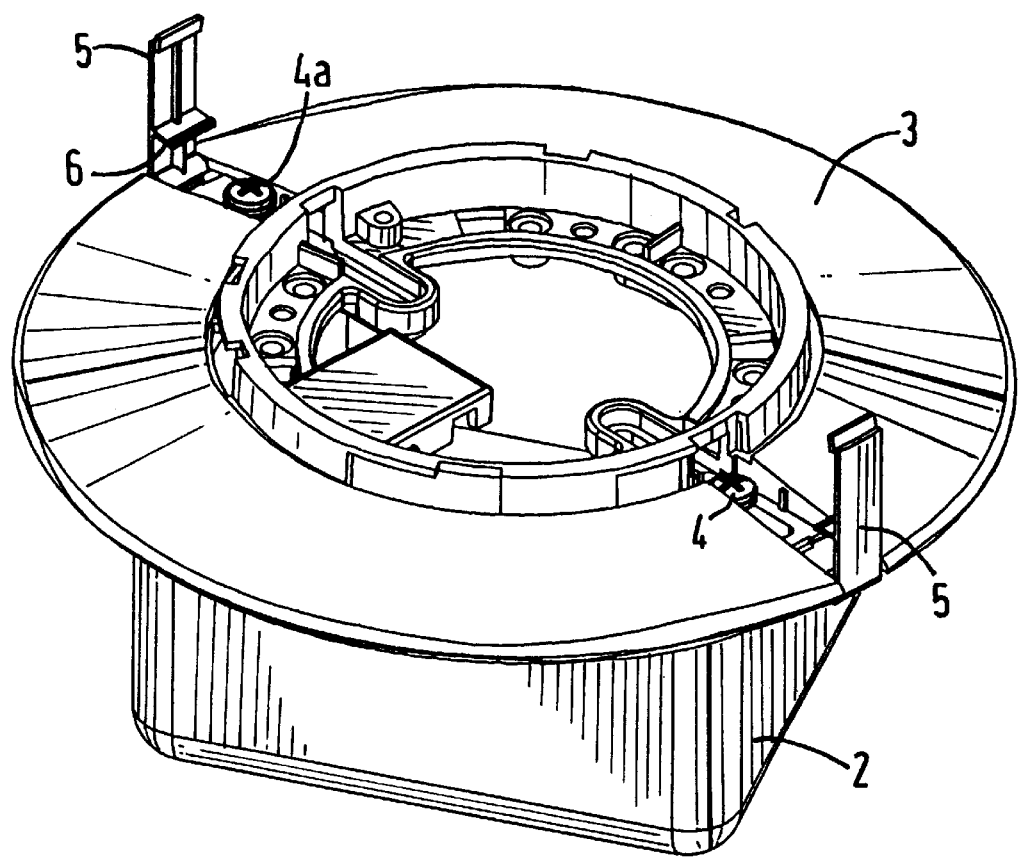
FIGS. 3a and 3b are similar views but showing the mounting base displaced to fit over screws.
Figure 3B:
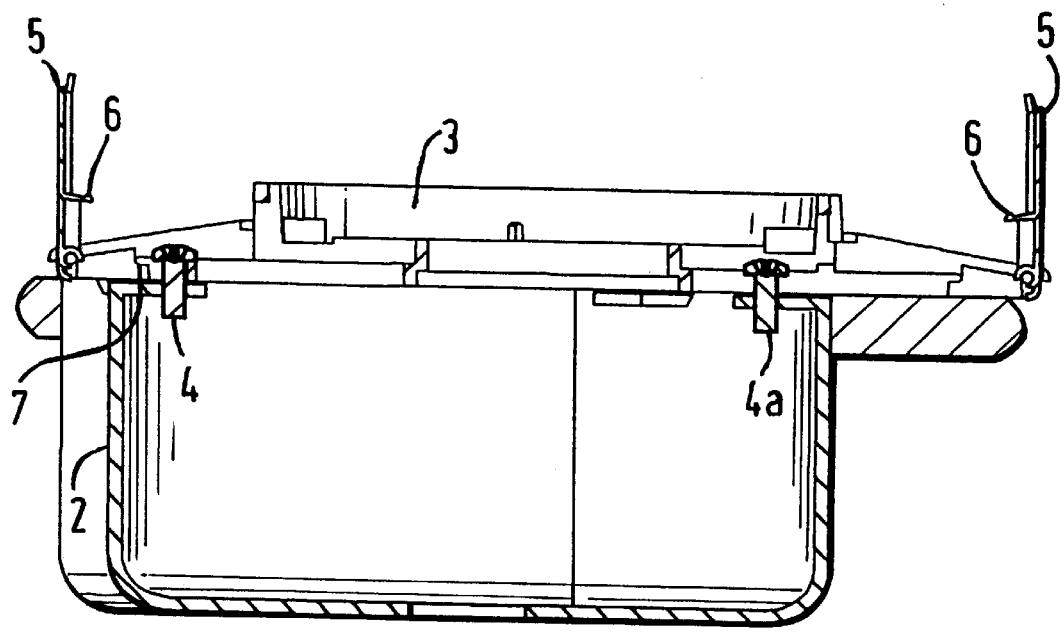

In this position, the screws can be tightened so that they apply pressure to the shoulders of the slots 3a, whereby the base is fixed firmly to the conduit box. It will be noted that the wider apertures, for receiving the screw heads, are adjacent opposite ends of the slots, so that the mounting base can be fitted over the screw heads only when it is displaced off-centre, for example, as shown in FIG. 3b.

Figure 4A:
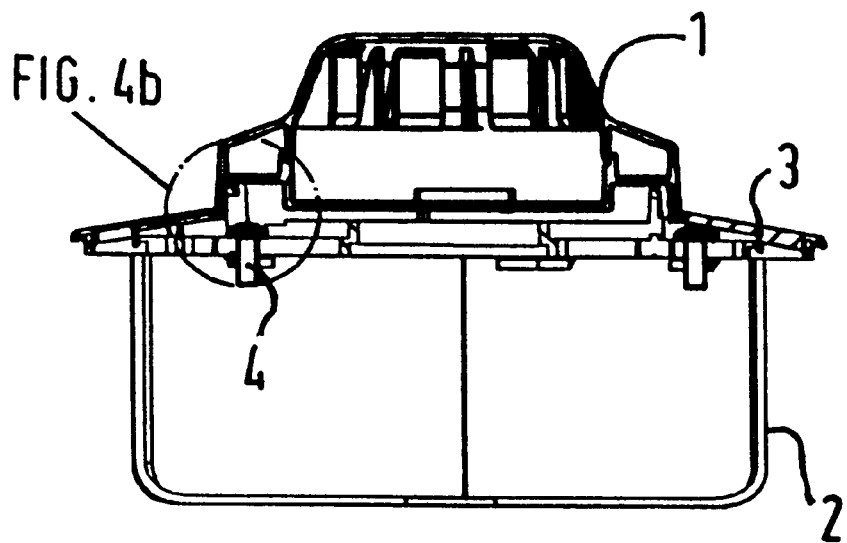
FIGS. 4a and 4b shows the mounting base with a head fitted thereto and an enlarged detail.

Cover members 5 in the form of hinged strips, are movable between an open position (shown in FIG. 1) and a closed position (shown in FIG. 2). In the open position, the screws 4 are revealed to enable installation. In the closed position, the screw heads are partially concealed, but are then totally concealed when the removable head 1 is fitted to the mounting base (see for example FIG. 4a). However, the screws need not be in the position shown, and may be at a different radial distance from the central axis of the assembly so that they are fully concealed by the cover member in its closed position. Moreover, whereas the slots 3a and wider apertures facilitate installation, since they enable the screws 4 to be inserted into the conduit box before the mounting base is offered up for installation, the slots 3a and wider apertures are not essential. Apertures wide enough to receive the shanks of the screws but smaller than the screw head would suffice.

Each cover member 5 has a resilient tab 6 which acts as a catch engaging an abutment 7 on the mounting base 3 so as to secure the cover member 5 in its closed position. This facilitates assembly, because the conduit box 2 and mounting base 3 are normally fitted to a ceiling, whereby the cover members 5 would hang downwardly as a result of being pivoted at one end (which is described in more detail below). The tabs 6 enable each cover member 5 to be snapped into its closed position, so that each cover member remains in this position when the head 1 is fitted to the base 3. If the resilient catches were not used, it would be necessary to hold the cover members 5 in their closed position, whilst fitting the head 1, which is a more difficult assembly. The tab 6 snaps passed the abutment 7, which is in the form of an undercut shoulder portion, when the cover member 5 is closed, but this snap action does not prevent the cover member from being pulled away from the screw 4, when the head is removed, so as to gain access to the screw.

One end of the cover member 5 is hinged to the mounting base 3, which enables it to be pivoted away from the screw into the open position without becoming detached from the mounting base. This is achieved by using a hinged construction in the form of a shell 8 and a pin 9 the shell 8 being open to enable it to be fitted onto the pin 9. The shell is cylindrical in construction and has a longitudinal slot which is not as wide as the diameter of the pin, so that the shell can be snap-fitted onto the pin. This facilitates assembly, whilst retaining the cover member 5 on the pin when it is opened to gain access to the screw. Preferably, the open slot faces away from the ceiling so that the cover member cannot be levered (at the hinge end) out of position. For example, the slot can be at about 45° from the vertical.

Figure 2A:
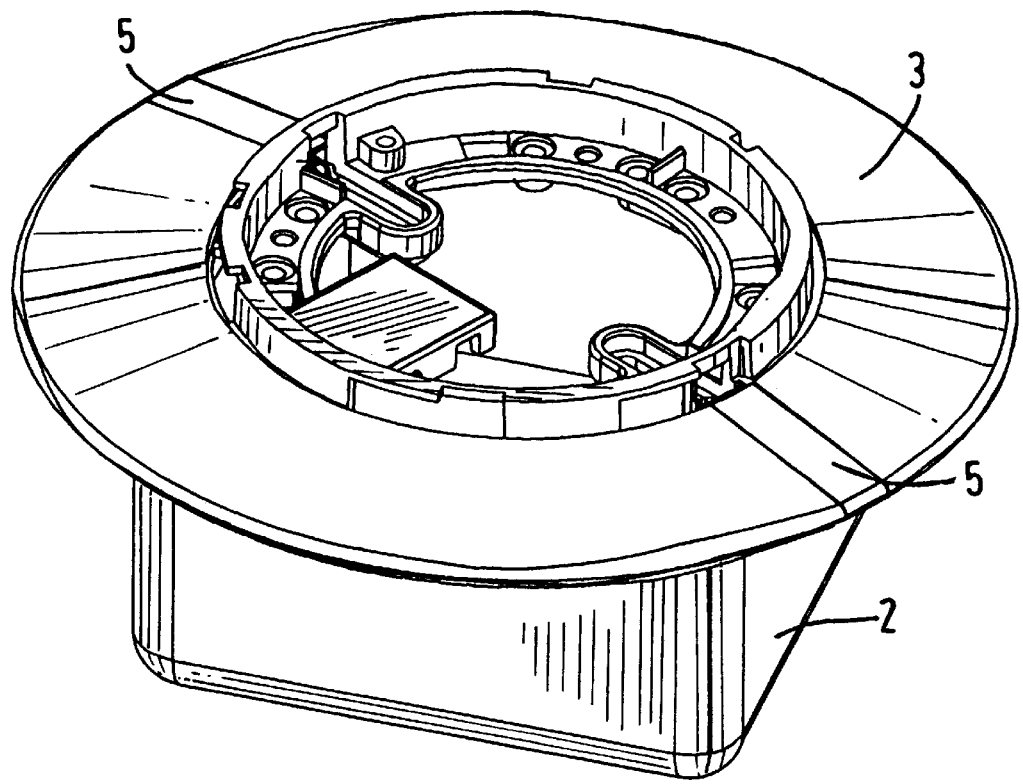
FIGS. 2a and 2b are similar views of the mounting base with the cover members in a closed position.
Figure 2B:
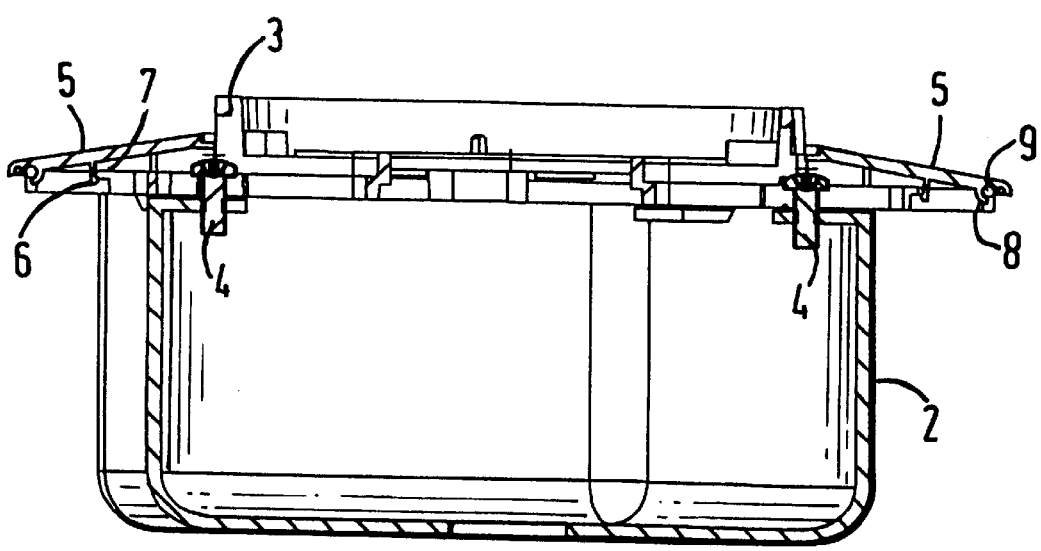

As shown in FIG. 2a, the cover member 5 is in the form of a flat strip which is flush with the external surface of the mounting base, e.g. a bezel assembly, in the closed position. This provides a neat finish, together with making the cover member inconspicuous when the mounting base is installed.

Figure 4B:
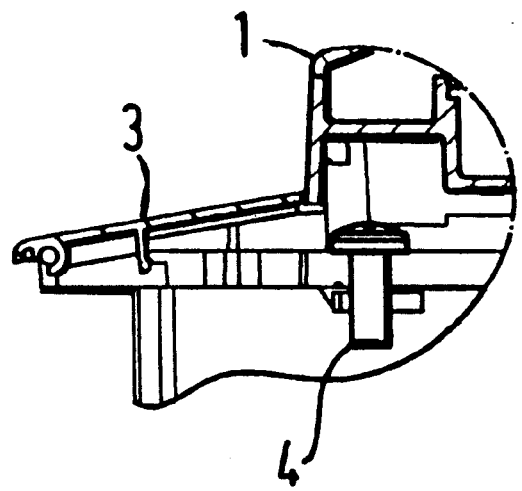
Figure 5A:
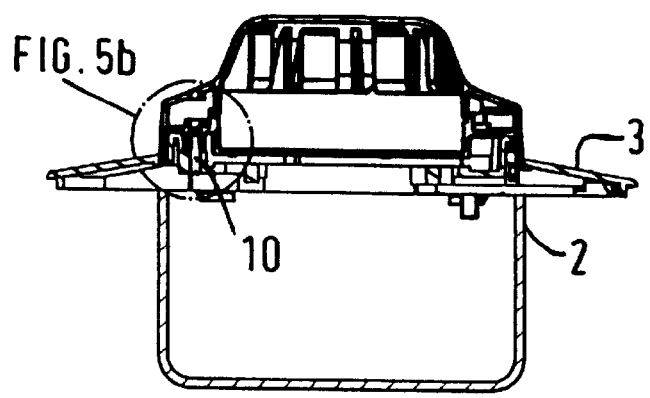
FIGS. 5a and 5b are similar views of a different embodiment of the invention.
Figure 5B:
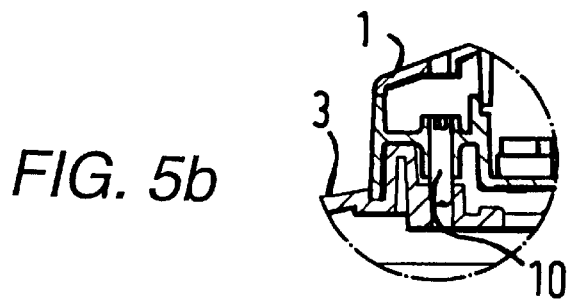
Figure 6:
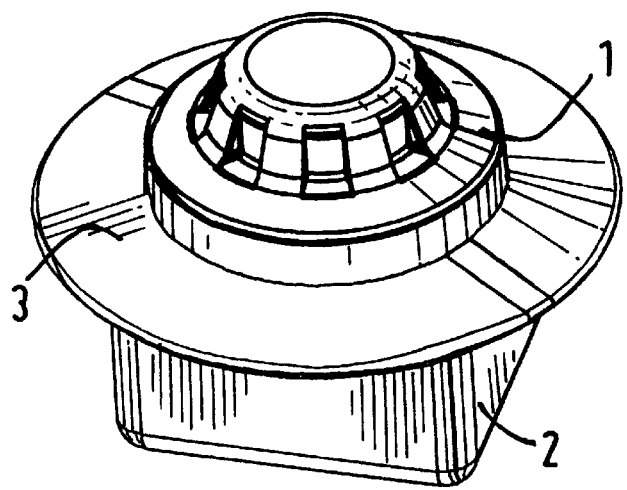
FIG. 6 a perspective view of a head fitted to a mounting base.

Referring to FIGS. 4, 5 and 6, the head 1 traps or engages with each cover member 5 when it is fitted to the base so as to prevent the cover members from being moved out of their closed positions. In FIG. 5a, a locking device 10 is used to secure the head 1 to the mounting base 3 and this can be fitted through an aperture by means of a special tool.

It will also be noticed that when the cover member 5 is in its closed position, it is secured laterally between a lower edge of the head and the hinge and this assists in securing the cover member and preventing its removal.

Whilst embodiments of the invention have been described in detail, it will be understood that these are but examples of the invention, and that modifications or changes may be made without departing from the scope or spirit of the invention as defined by the accompanying claims

What is claimed is:

1. A mounting base which is intended to be secured to a structure, or to a conduit box by means of screws, and which is adapted for receiving a removable head, the mounting base having at least one cover member movable between an open position and a closed position, the open position providing access to the respective screw so that the mounting base can be fitted or removed, the cover member being retained by the mounting base so that it can be moved between said open and closed positions without becoming detached from the mounting base.

2. A mounting base according to claim 1, wherein the cover member is hinged to the mounting base so that it can be pivoted away from the screw into the open position without becoming detached from the mounting base.

3. A mounting base according to claim 2, wherein the hinge comprises a shell and a pin, the shell being open to enable it to be fitted to the pin.

4. A mounting base according to claim 3, wherein the shell has an opening which is not as wide as the diameter of the pin so that the shell can be snap fitted onto the pin.

5. A mounting base according to a claim 2, wherein the cover member is hinged to the mounting base so that it can be pivoted away from the screw into the open-position without becoming detached from the mounting base and wherein the head engages the cover member so that the cover member is trapped between the head and the hinge.

6. A mounting base according to claim 1, wherein the cover member is slidably mounted in the mounting base so that it does not become detached therefrom when moving between the open and closed positions.

7. A mounting base according to claim 1, wherein the cover member is flush with an external surface of the mounting base when the cover member is in its closed position.

8. A mounting base according to claim 1, wherein the cover member partially conceals the head of the screw in the closed position, the remainder of the screw head being concealed by a part of the removable head when fitted to the base.

9. A mounting base according to claim 1, wherein the cover member includes a resilient member which secures, or assists in securing, the cover member in its closed position, so that the cover member remains in the closed position prior to fitting the head to the base, the resilient member being resilient enough to enable disengagement when the cover member is pulled away from the screw to move it into the open position.

10. A mounting base according to claim 1, wherein the head, when fitted to the base, traps the cover member so as to prevent the cover member from being moved out of its closed position.

11. A mounting base according to claim 1, wherein the cover member is a strip hinged adjacent one end to the mounting base, the other end of the strip at least partially concealing the screw when the cover member is in its closed position.

12. A mounting base according to claim 1, wherein the head is secured to the mounting base by a locking member.

13. A mounting base according to claim 1, wherein the base includes slots to enable it to be slid laterally with respect to the screws, the slots having apertures wide enough to receive the screw heads so that the mounting base can be positioned over the screws and then slid into position.

14. A mounting base for a removable head, wherein said mounting base is intended to be secured to a structure, or to a conduit box by means of screws, and is adapted to receive a removable head; said mounting base having at least one cover member movable between an open position and a closed position, said open position providing access to the respective screw so that said mounting base can be fitted or removed, and wherein said cover member is hinged to the mounting base so that it can be pivoted away from the screw into an open position without becoming detached from the mounting base, the hinge including an open shell and a pin whereby said cover member can be forcibly attached to said mounting base during installation.

15. A mounting base which can be fixed, by means of screws, directly to a structural member, said mounting base comprising one or more cover members which are movable between open position and closed positions, said open position providing access to said screws so that the mounting base can be fitted or removed, and wherein said cover member is hinged to the mounting base so that it can be pivoted between said open and closed positions without becoming detached from the mounting base, said hinge including an open member and a pin, said pin being received and retained in said open member so that said cover member can be removably attached to said base, and wherein a resilient member provides a snap fit between the cover member and the base to secure it in the closed position.

* * * * *